3,210,153
PROCESS FOR THE PRODUCTION OF CHLORINE
AND ALKALI METAL NITRATE
Gerlando Marullo and Giacinto Veronica, Novara, Italy, assignors to Montecatini Società Generale per l'Industria Mineraria e Chimica, a corporation of Italy
Filed Feb. 5, 1962, Ser. No. 171,301
Claims priority, application Italy, Feb. 8, 1961, 2,297/61
1 Claim. (Cl. 23—102)

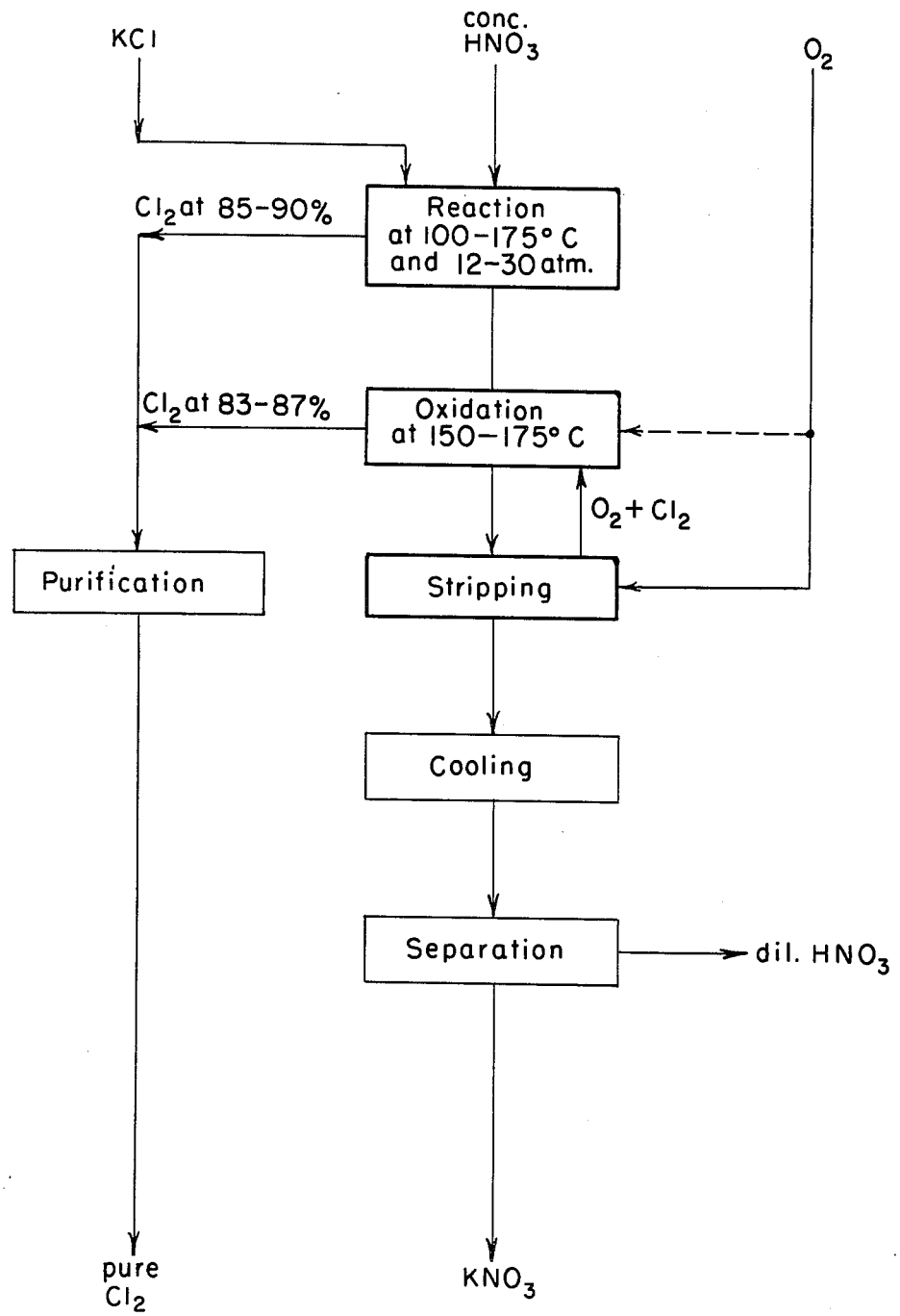

Our invention relates to a process for obtaining gaseous chlorine and a nitrate solution of an alkali metal.

In the last twenty years, because of the great demand for chlorine, several processes have been developed for the non-electrolytic production thereof, in order to divorce the manufacture thereof from that of sodium hydroxide which is simultaneously produced by the conventional electrolysis process.

The proces which has achieved some commercial success, among the chemical processes devised, utilizes the decomposition of chlorides of alkali metals by nitric acid, according to the reaction:

(1) $3NaCl + 4HNO_3 \rightarrow$
$3NaNO_3 + Cl_2 + NOCl + 2H_2O - 20.4$ kcal.

The sodium chloride of the above reaction may be replaced with potassium chloride. By this substitution, potassium nitrate, which is a more widely employed salt, both as a polyvalent fertilizer and as industrial product, is obtained.

The above-mentioned reaction is carried out under atmospheric pressure and at a temperature less than or equal to the boiling point of nitric acid.

A drawback of the above schematic process is the fact that only two thirds of the introduced halogen are recovered as elemental halogen; moreover the presence of appreciable amounts of NOCl in the gaseous phase increase the problem of the strength resistance of materials, which is already severe because of the simultaneous presence of nitric acid and chlorine.

Since nitrosyl chloride, per se, has found only limited applications, the production processes according to reaction 1 have been generally developed in the direction of either converting NOCl to chlorine through oxidizing reactions, or recycling NOCl to the conversion step, after degradation to chloride, by means of different agents (reducing substances, alkali etc.).

Oxidizing processes are carried out according to two principles:

(a) Oxidation with oxygen or air, in the presence or in the absence of catalysts, in gaseous or liquid-gaseous phase;

(b) Oxidation with concentrated nitric acid, or sulphonitric mixtures.

Both groups of reactions have the common characteristic that they are always carried out subsequently to the basic reaction 1, in a separate step and, generally, require previous separation of the nitrosyl chloride from the gaseous mixture. It is preferred, and in certain cases it is required, that the nitrosyl chloride be completely separated, not only from the chlorine but also from the water vapor present in the gaseous phase of Equation 1.

Moreover, the chlorine recovered through oxidation always results in mixtures with $NO_2$ and with different nitrogen oxides, according to the general oxidation scheme:

(2)    $2NOCl + O_2 \rightarrow 2NO_2 + Cl_2$ and necessitates a further separation such as by fractional distillation or adsorption in selective solvents.

The above indicates that the recovery of elemental chlorine from NOCl, which is ⅓ of the chlorine entering the primary reaction, constitutes, according to any of the above schemes, a difficult operation cycle, either from the technical or the economical point of view. This is shown by the fact that in recent years the research was remarkably intensified on the disposal possibilities of NOCl as such, as to divorce the basic process of Equation 1 from all of the subsequent operating steps of transformation.

We have found a process which permits the chlorine contained in the starting NaCl to be recovered, in high yields, as gaseous chlorine. This process is shown in the accompanying self-explanatory drawing.

We have found that when the basic conversion reaction 1 is made to take place under pressure, equilibrium conditions occur, depending on the temperature chosen, whereby the halogenated constituent of the gaseous phase is constituted substantially of elemental chlorine, whereas the corresponding amount of NOCl is found almost entirely as a solution in the liquid phase.

Therefore, depending upon the degree of transformation according to Equation 1, a large portion of the theoretically available elemental chlorine may be obtained directly as gas which contains 85–90% chlorine, the remainder of the gaseous phase, by volume, being constituted of steam, nitrogen oxides, NOCl. Simultaneously a liquid phase may be obtained which, by further heating or by other known means, releases a gaseous phase constituted of $NOCl + Cl_2$ and therefore is able to undergo a complete and rapid conversion according to the scheme 2.

The process according to the present invention may be generally carried out by heating, in a closed autoclave of titanium or tantalum, a mixture of nitric acid and a chloride of an alkali metal (for instance, potassium chloride) wherein the amount of the first (as 100% $HNO_3$) is at least four times as much as that required according to the scheme 1, and the concentration of $HNO_3$ is at least of 60%. In practice, the temperature should be not less than 100° C. and is preferably between 100° and 175° C.; however, it is not useful to exceed 175° C. in order to avoid strong decompositions of nitric acid.

In performing the process according to the present invention, the adoption is foreseen, for each temperature, of equilibrium pressures equal to or higher than those values at which a practical separation occurs between $Cl_2$ (present in the gaseous phase) and NOCl (which passes in solution in the liquid phase). In the temperature range 100°–150° C., said values correspond to total pressures of 12, 15, 18, 22 atmospheres, at 100°, 120°, 135° and 150° C., respectively.

The equilibrium solution so obtained, which is saturated with NOCl and contains variable amounts of undecomposed chloride, passes to another reactor (or series of reactors) wherein the NOCl oxidation occurs, and the decomposition is simultaneously completed. The solution is heated at temperatures in the range between 150° and 175° C.; thus the decomposition of the alkaline chloride is completed and the nitrosyl chloride, NOCl, is brought in the gaseous phase. Pure $O_2$ is added in order to achieve the NOCl oxidation according to Equation 2 and to oxidize the nitrogen oxide to $HNO_3$ according to the equation:

(3)    $2NO_2 + H_2O + ½O_2 \rightarrow 2HNO_3$

The theoretical amount of $O_2$ for reactions 2 and 3 is 0.75 mole for one mole NOCl; an $O_2$ amount equal to or slightly less than the theoretical amount is employed. The oxidation is carried out at temperatures ranging between 150° and 175° C. When operating at 150° C., it is necessary that the final partial pressure of $Cl_2$ does not exceed 8 atmospheres, and when operating at 175° C., 12 atmospheres, since these values correspond to the equilibrium values of oxidation reaction 2.

A liquid containing 3–5 g./l. Cl⁻ is obtained, which is considered entirely decomposed and contains the excess of free $HNO_3$ and the nitrate produced by the reaction; the nitrate is separated by cooling, whereas the diluted acid, which is concentrated again by distillation, is recycled.

The following examples are given to illustrate, but not to limit, the invention.

EXAMPLE 1

A mixture of 1070 g. of 65% $HNO_3$ and 210 g. of pure KCl was heated to 100° C. in a 2.5 liter autoclave of titanium (or tantalum), until a pressure of 12 atmospheres was reached; at which pressure an equilibrium was established which corresponded to the obtainment of a gaseous phase made up (steam excepted) of: $Cl_2$ 90%; $N_2O_3$ 6%; NOCl 4% and contained in total 38.4 g. $Cl_2$ and of a liquid phase containing about 55 g./l. Cl⁻ (relative to undecomposed chloride), as well as 34 g. NOCl, namely the amount corresponding, according to reaction 1, to the chlorine released, except for the small amount of NOCl, present in said gaseous phase.

While the gaseous phase so obtained may be considered as an end product, except for a final purification to be accomplished by any desired known process, the liquid phase is divided in two 2-liter intermediate autoclaves wherein said phase is heated up to 150° C. In each autoclave 9 liters of a gaseous mixture were introduced, which mixture contained 62% $O_2$, 33% $Cl_2$, 5% $N_2O_3$, and came from a final autoclave wherein the decomposition was carried to completion (until 3–5 g./l. of residual Cl⁻). From this pair of autoclaves, which at 150° C. had an equilibrium total pressure of 12 atmospheres, a gas was obtained containing about 87% $Cl_2$, 3% NOCl, 3% $O_2$, 7% $N_2O_3$, having a liquid phase which was placed into a final autoclave kept at 150° C., at 12 atmospheres, wherein 14 liters of 100% oxygen were bubbled through the liquid. A gaseous phase was obtained which was made up substantially of an oxygen and chlorine mixture, which was introduced into the above-said pair of intermediate autoclaves, and a liquid phase containing 3–5 g./l. Cl⁻; from this liquid phase, $KNO_3$ and the excess of $HNO_3$ were recovered by a conventional process.

According to the above exemplified process, about 38% of the total introduced chlorine-ion, which corresponds to about 57% of that produced according to the complete course of reaction 1, were obtained directly from the first autoclave, in the gaseous state. The $Cl_2$–NOCl mixture to be oxidized had a molar ratio $NOCl/Cl_2$ of about 2.45:1 in comparison with the ratio 1:1 which occurred when carrying out the decomposition at atmospheric pressure.

EXAMPLE 2

A $HNO_3$–KCl mixure such as that of the preceding example, was heated in the same autoclave up to 150° C. When a pressure of 22 atmospheres was reached, an equilibrium state was estalished which corresponded to the obtainment of a gaseous phase constituted of 87% $Cl_2$, 5% $N_2O_3$, 8% NOCl and containing about 50 g. $Cl_2$, and a liquid phase containing about 30 g./l. of Cl⁻ (relative to undecomposed chloride) as well as 43 g. NOCl, namely the amount corresponding, according to the reaction 1, to the chlorine released, except for the small amount of NOCl which is present in the gaseous phase. The liquid phase was conveyed to a 2-liter autoclave which was heated to 175° C., wherein 11 liters of oxygen were introduced. Under the pressure of 17 atmospheres, a gaseous phase was obtained which was made up of: 83.5% $Cl_2$, 6.5% NOCl, 7% $N_2O_3$, and 3% $O_2$. The liquid phase was transferred to a final autoclave wherein, at 175° C., decomposition was carried to completion and simultaneously the oxidation of the therein originated NOCl aliquot part was accomplished by introduction of 2.4 liters oxygen. The gas now obtained showed nearly the same composition as the one obtained from the 2nd autoclave, whereas the liquid phase with 3–5 g./l. Cl⁻ passed to the recovery operations of $KNO_3$ and the excess nitric acid.

In this case the $Cl_2$ amount obtained directly from the first autoclave represents about 50% of the introduced Cl⁻ and corresponds to about 75% of the $Cl_2$ which would have been produced according to the complete course of reaction 1. Correspondingly, the mixture which is subjected to oxidation shows a molar ratio $NOCl/Cl_2$ of about 4.7:1.

We claim:

A process for the production of gaseous chlorine and of nitrate of an alkali metal from the corresponding alkali metal chloride, nitric acid and oxygen, which comprises carrying out the alkali metal chloride decomposition by means of nitric acid at a concentration of at least 60% and in amount at least four times as much as the stoichiometrical equivalent to the treated chloride, under overall pressures between 12–30 atm., and at temperatures in the range between 100° and 175° C., while obtaining a gaseous phase consisting of 85–90% chlorine, and a liquid phase containing nitrosyl chloride and the balance of the alkali metal chloride, separating said gaseous phase and said liquid phase, heating said liquid phase to release a second gaseous phase constituted of nitrosyl chloride and chlorine, treating said second gaseous phase with about 0.75 mole of oxygen per mole of NOCl, at temperatures between 150° and 175° C. with a maximum partial pressure of chlorine between 8 and 12 atm., thereby yielding a third gaseous phase comprising chlorine and a second liquid phase comprising alkali metal nitrate.

References Cited by the Examiner

UNITED STATES PATENTS

| | | | |
|---|---|---|---|
| 2,150,669 | 3/39 | Beekhuis | 23—103 |
| 2,208,112 | 7/40 | Beekhuis | 23—102 |
| 2,296,763 | 9/42 | Beekhuis | 23—219 X |

FOREIGN PATENTS 1,098,920  2/61  Germany.

OTHER REFERENCES

Uhlig: "Corrosion Handbook," pp. 772 to 775, pub. by John Wiley and Sons, London (1948).

MAURICE A. BRINDISI, *Primary Examiner.*